Nov. 7, 1950  A. BJORKLUND  2,528,942
LEAF DISINTEGRATOR

Filed March 8, 1946  4 Sheets-Sheet 1

INVENTOR.
Arvid Bjorklund
BY Harry D. Kilgore
Attorney

Nov. 7, 1950 A. BJORKLUND 2,528,942
LEAF DISINTEGRATOR
Filed March 8, 1946 4 Sheets-Sheet 2

INVENTOR:
Arvid Bjorklund
BY
Harry S. Kilgore
Attorney

Nov. 7, 1950 — A. BJORKLUND — 2,528,942
LEAF DISINTEGRATOR
Filed March 8, 1946 — 4 Sheets-Sheet 3
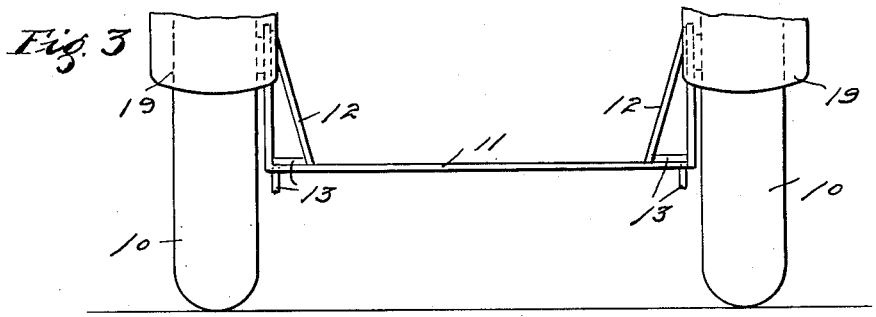
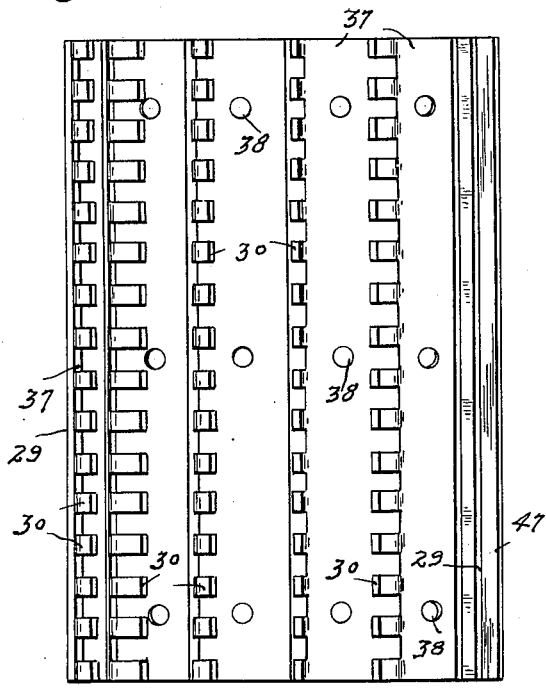
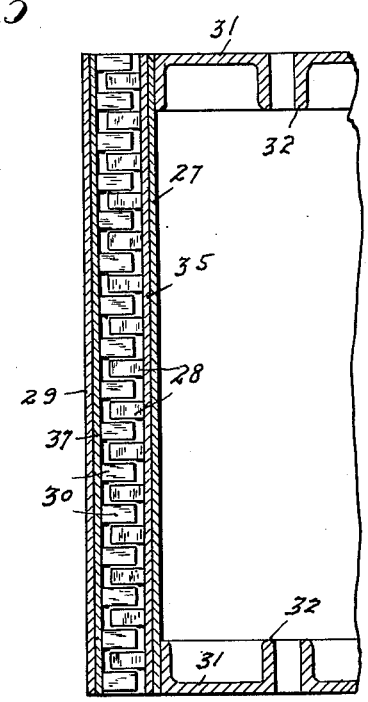
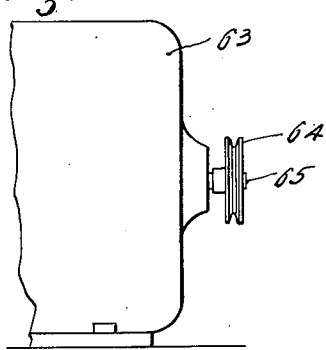
INVENTOR.
Arvid Bjorklund
BY Harry D. Kilgore
Attorney Nov. 7, 1950 A. BJORKLUND 2,528,942
LEAF DISINTEGRATOR
Filed March 8, 1946 4 Sheets-Sheet 4
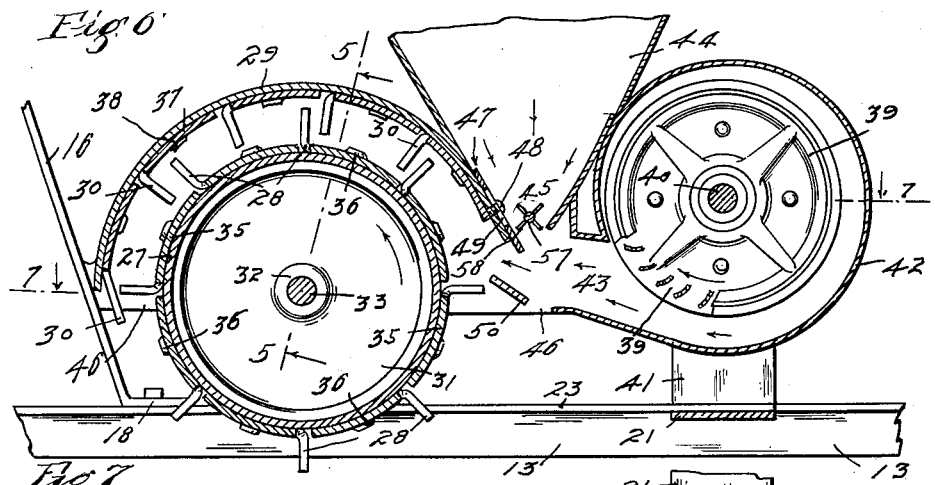
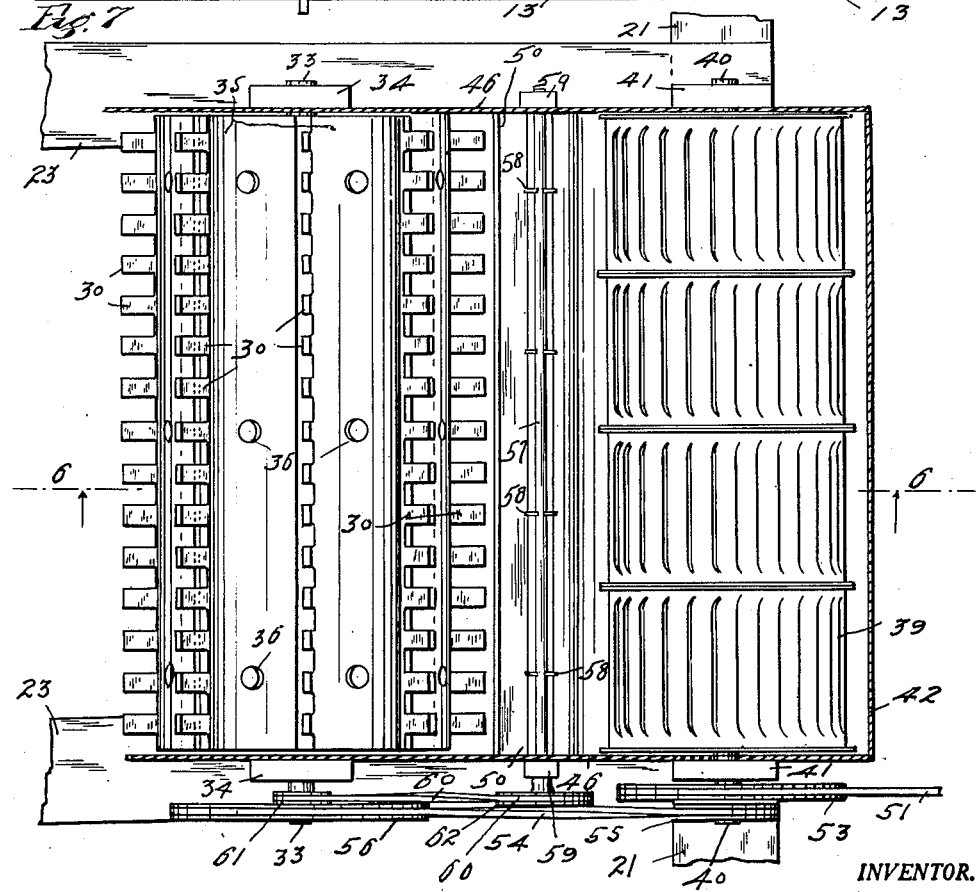
INVENTOR.
Arvid Bjorklund
BY Harry D. Kilgore
Attorney Patented Nov. 7, 1950

2,528,942

UNITED STATES PATENT OFFICE 2,528,942

LEAF DISINTEGRATOR

Arvid Bjorklund, Minneapolis, Minn.

Application March 8, 1946, Serial No. 652,845

3 Claims. (Cl. 275—1)

My present invention relates to improvements in leaf disintegrators.

The object of this invention is to provide a portable leaf disintegrator that may be conveyed from place to place and fallen leaves that have previously been raked into piles or windrows, forked or otherwise placed therein and the disintegrated leaves used as a fertilizer.

To the above end, the invention consists of the novel devices and combination of devices hereinafter described and defined in the claims.

In the accompanying drawings, which illustrate the invention, like characters indicate like parts throughout the several views.

Referring to the drawings:

Fig. 3 is a fragmentary view in rear elevation;

Fig. 4 is a bottom plan view, on an enlarged scale, showing the tooth equipped concavo-convex plate, turned upside down and end for end;

Fig. 5 is a fragmentary view partly in elevation and partly in section, taken on the line 5—5 of Fig. 6;

Fig. 6 is a view partly in elevation and partly in section taken on the line 6—6 of Fig. 7;

Fig. 7 is a view partly in plan and partly in section taken on the line 7—7 of Fig. 6, and Fig. 8 is a fragmentary view of an electric motor having a pulley on its armature shaft.

Figure 1:
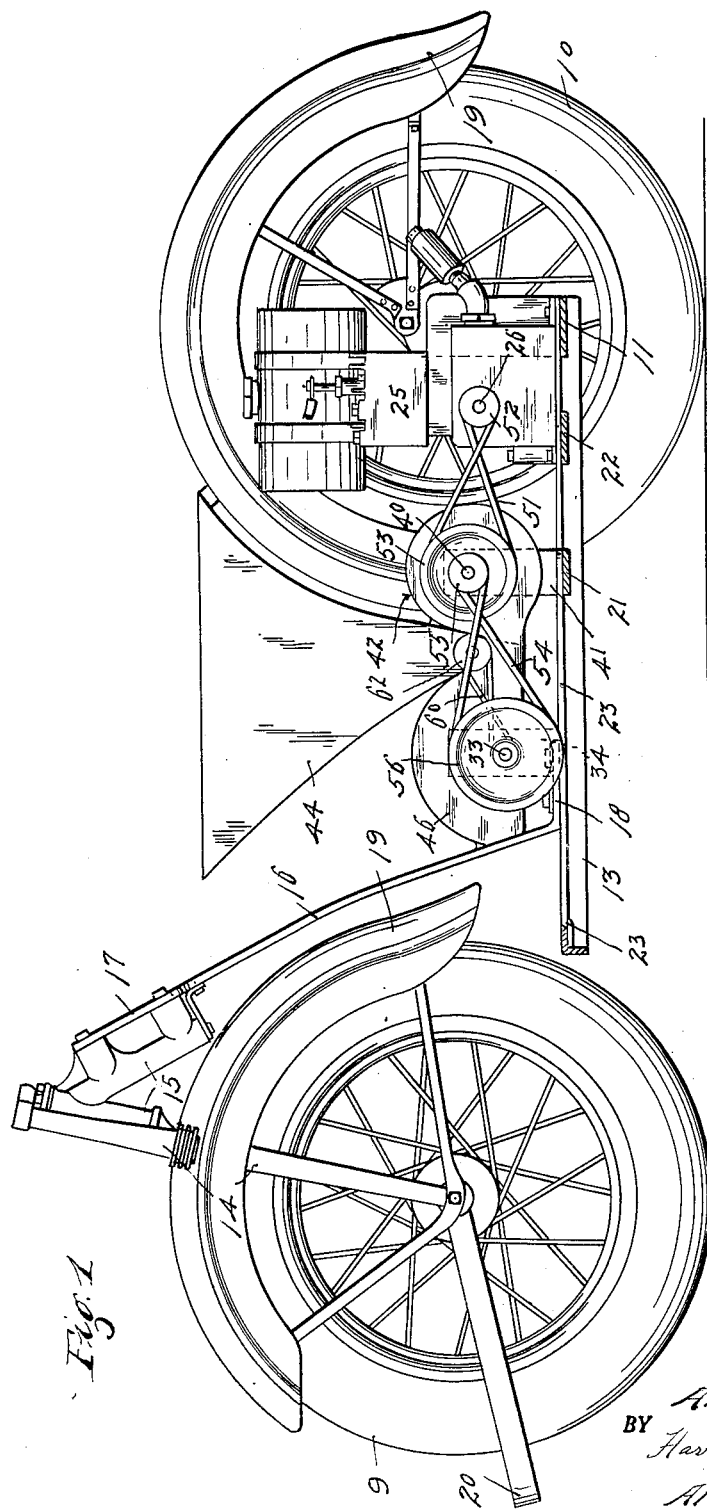
Fig. 1 is a view in side elevation showing one embodiment of the invention.
Figure 2:
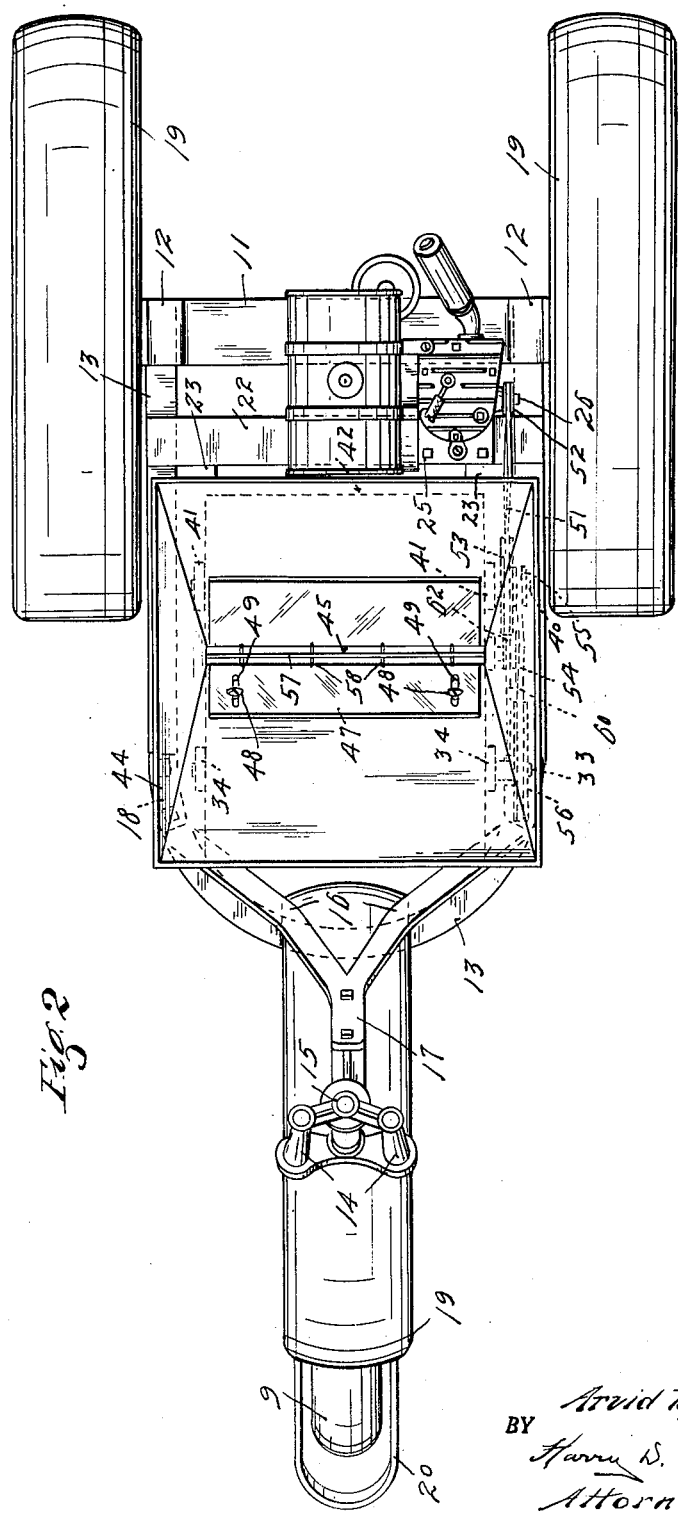
Fig. 2 is a plan view of the same.

The leaf disintegrator is embodied in a vehicle, in the form of a tricycle and wherein the front wheel and the two rear wheels are designated by the numerals 9 and 10 respectively. The rear wheels 10 are journaled on a rear axle 11 in the form of a wide $u$. Braces 12 for the upright members of the rear axle 11 are welded or otherwise rigidly secured to said members and the transverse member of said axle.

The frame 13 of the vehicle is a horizontally disposed angle bar bent to the form of a yoke. The side members of the frame 13 are rigidly secured at their outer end portions, to the rear axle 11 and project forwardly thereof, see Fig. 7.

The front wheel 9 is journaled in a fork 14 that has on its upper end a head 15. The frame 13, at its front end portion, is held suspended from the head 15 by a pair of upwardly and forwardly inclined bars 16 that terminate in a tongue 17 that is rigidly secured to the head 15. These bars 16, at their lower ends, have feet 18 that rest on the side bars of the frame 13.

The wheels 9 and 10 are provided with mud guards 19. A coupling yoke 20 is attached to the fork 14 to which a cable, not shown, may be attached for towing the leaf disintegrator.

The frame 13 further includes transverse bars 21 and 22 and two longitudinal bars 23. The two bars 21 and 22 are rigidly secured, at their end portions, to the side members of the frame 13 and the bars 23 are rigidly secured, at their front end portions, to the curved transverse portion of the frame 13 and at their rear end portions to the transverse bars 21 and 22. The longitudinal bars 23 lie in the plane of the inturned horizontal flanges of the frame 13.

An internal combustion engine is indicated as an entirety by the numeral 25 with the exception of its shaft 26. This motor 25 rests on the axle 11 and the transverse bar 22, as a base, and is bolted thereto.

The leaf disintegrator includes a rotor 27 having radially projecting teeth 28 and an overlying concavo-convex plate 29 having on its concave side radially projecting teeth 30. The rotor 27, as shown, is a horizontal cylinder that extends transversely over the frame 13. Said cylinder has its ends closed by heads 31 having at their axes hubs 32 through which a shaft 33 extends and is rigidly secured thereto. This shaft 33 is journaled in bearings 34 on the longitudinal bars 23.

The teeth 28 are arranged in circumferentially spaced rows that extend parallel to the axes of the rotor 27. The teeth 28, in each row, are integral with one edge of a concavo-convex plate 35 that rests on the rotor 27 and is secured thereto by rivets 36. These plates 35 substantially completely cover the rotor 27.

The plate 29 is rigidly secured, in part, to the bars 16 and is concentric to the rotor 27 and the teeth 30 are arranged in circumferentially spaced rows. These teeth 30, in each row, are integral with one edge of a concavo-convex member 37 that fits on the concave side of the plate 29 and is rigidly secured thereto by rivets 38. As shown, the teeth 28 and 30 are each rectangular in cross-section. During the rotation of the rotor 27 its teeth 28 pass between the teeth 30 with a good working clearance.

It will be noted, by reference to Fig. 6, that the teeth 30 in the forward row are downwardly inclined to assist in the stripping of leaves therefrom.

A rotary blower 39 is mounted rearward, in respect to the vehicle, of the disintegrator. This blower 39 extends parallel to the rotor 27 and is mounted on a shaft 40 journaled in bearings 41 on the longitudinal frame bars 23. The housing 42 for the blower 39 has a discharge throat 43 arranged to direct a blast of air upwardly into the space between the rotor 27 and the plate 29.

A hopper 44 is mounted between the rotor 27 and the blower housing 42 and has in its bottom a narrow discharge opening 45 that extends the full length of the blower 39. The side members 46 of the blower housing 39, the hopper 44 and the plate 29 are all connected as an entirety.

Mounted in the hopper 44 is a slide 47 that is operable, at will to vary the transverse width of the hopper discharge opening 45, or in other words, the conducting capacity of said opening. The slide 47 is adjustably secured to the hopper 44 by screws 48 that extend through slots 49 in said slide and have threaded engagement with said hopper.

A forwardly and upwardly inclined deflector plate 50, between the rotor 27 and a vertical line projecting downwardly from the lower edge of the slide 47 is rigidly secured at its ends to the side members 46. The slide 47 is on the inner wall of the hopper 44 that is next to the rotor 27.

The blower 39 and the rotor 27 are driven from the motor 25 by the following connections, to wit: a crossed-belt 51 runs over a small pulley 52 on the drive shaft 26 of the motor 25, and a large pulley 53 on the shaft 40 of the blower 39. A crossed-belt 54 runs over a small pulley 55 on the shaft 40 and large pulley 56 on the shaft 33 of the rotor 27.

To facilitate the feeding of the leaves from the hopper 44 into the blast of air from the blower 39, there is mounted in said hopper, at its discharge opening 45, a rotary agitator. This agitator is in the form of a shaft 57 having radial stirring pins 58 and journaled in bearings 59 on the side members 46. The agitator is driven by a crossed-belt 60 that runs over a small pulley 61 on the shaft 53 and a relatively large pulley 62 on the agitator shaft 57.

The leaf disintegrator, above described, may be drawn as a trailer from place to place by an automobile or truck having a towing cable attached to the coupling yoke 20.

In some instances it might be desirable to employ an electric motor 63 shown in Fig. 8, in place of the internal combustion engine 25, and mounting a pulley 64 on its armature shaft 65 for the belt 51.

Fallen dead leaves, after being raked into piles, are forked or otherwise deposited into the hopper 44 of the vehicle which has been towed up to a pile of leaves.

It may be assumed that the motor 25 is operating and the blower 39 and the rotor 27 are being rotated by the connections from the motor 25, in the direction of the arrows marked thereon in Fig. 6. Leaves in the hopper 44 are precipitated through the opening 45 in the bottom of said hopper and into the blast of air from the blower 39 in a curtain-like shower transversely of said blast, the full width thereof. As the leaves enter the blast of air from the blower 39 they are carried upwardly therewith over the deflector plate 50 and between the rotor 27 and the plate 29. From thence the leaves are carried by the upwardly moving rows of teeth 28 on the rotor 27 and progressively brought into contact with the stationary rows of teeth 30 on the plate 29. As the rows of teeth 28 pass between the stationary rows of teeth 30 the leaves are crushed thereby and broken into small particles. The disintegrated leaves after having passed the last row of stationary teeth 30 are precipitated through the open frame 13 directly onto the ground for use as a fertilizer. Or in case the disintegrated leaves are to be used at some other place, as a fertilizer, a canvas or other receptacle may be placed on the ground under the vehicle and onto which the disintegrated leaves are precipitated.

It will of course be understood that the leaf disintegrator may be operated while being slowly towed and particularly when the leaves are raked in windrows.

Stones, heavy sticks and the like, when thrown into the hopper 44 with the leaves, will drop completely through the blast of air from the blower 39 and be deposited on the ground.

From the foregoing, it must be evident that the invention herein described is capable of a large range of modifications within the scope of the invention herein disclosed and claimed.

What I claim is:

1. In a device of the class described, a frame, a leaf disintegrator, including a rotor having circumferentially spaced rows of teeth and a concavo-convex plate having circumferentially spaced rows of teeth, between which, teeth of the rotor pass during the rotation thereof, a blower housing, a rotatable blower in the housing having a discharge throat through which a blast of air from the blower is directed between the rotor and the plate, a motor on the frame, driving connections from the motor to the rotor and the blower, a hopper extending between the housing and the plate, said hopper having a discharge opening through which leaves are precipitated into said blast of air to be carried thereby between the rotor and the plate, and a deflector for directing air from the blower between the rotor and the plate.

2. In a device of the class described, a frame, front and rear wheels journaled on the frame, a blower housing and a leaf disintegrator housing having an open bottom mounted on the frame, the latter forwardly of the former, a blower in the blower housing, a disintegrator in the disintegrator housing comprising a rotor and a concave plate above the rotor, said rotor and concave plate each having co-operating teeth, a throat leading from the blower housing through which a blast of air from the blower is discharged into the disintegrator housing between the rotor and the concave plate at one side of the axis of the rotor, and a hopper having a discharge opening in the top of the throat through which leaves deposited in the hopper are precipitated into the blast of air.

3. In a device of the class described, a frame, ground wheels journaled on the frame, a blower housing and a leaf disintegrator housing spaced the one from the other, a blower in the blower housing, a disintegrator in the disintegrator housing, means for driving the blower and the disintegrator, a throat leading from the blower housing to the disintegrator housing, said disintegrator and throat having open bottoms, a leaf deflector in the throat at its discharge end, said blower being constructed and arranged to deliver a blast of air through the throat and into the disintegrator housing, and a hopper having a discharge opening in the top of the throat directly above its open bottom through which leaves deposited in the hopper are precipitated into the blast of air in the throat.

ARVID BJORKLUND.

REFERENCES CITED

The following references are of record in the file of this patent:

UNITED STATES PATENTS

| Number | Name | Date |
| --- | --- | --- |
| 598,815 | Richter | Feb. 8, 1898 |
| 1,025,480 | Pack | May 7, 1912 |
| 1,631,233 | Tescher | June 7, 1927 |
| 2,105,803 | Barnes | Jan. 18, 1938 |
| 2,148,547 | Fiese et al. | Feb. 28, 1939 |
| 2,244,987 | Faulkner | June 10, 1941 |
| 2,316,124 | Sheldon | Apr. 8, 1943 |
| 2,353,836 | Lindig | July 18, 1944 |
| 2,436,011 | Lucas | Feb. 17, 1948 |

FOREIGN PATENTS

| Number | Country | Date |
| --- | --- | --- |
| 671,378 | France | Sept. 2, 1929 |